(12) United States Patent
Hauser et al.

(10) Patent No.: US 7,887,072 B2
(45) Date of Patent: Feb. 15, 2011

(54) STABILIZER BAR WITH DISCONNECTABLE LINK

(75) Inventors: Kurt Hauser, Northville, MI (US); Thomas E. Gansenhuber, Lapeer, MI (US); Jeffrey L. Kincaid, Clarkston, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 12/575,926

(22) Filed: Oct. 8, 2009

(65) Prior Publication Data

US 2010/0090432 A1   Apr. 15, 2010

Related U.S. Application Data

(60) Provisional application No. 61/104,048, filed on Oct. 9, 2008.

(51) Int. Cl.
*B60G 21/055* (2006.01)
(52) U.S. Cl. .............. 280/124.107; 403/109.2; 403/109.3; 403/109.7; 280/5.511; 280/124.152
(58) Field of Classification Search ........... 280/5.5, 280/5.502, 5.507, 5.508, 5.511, 124.106, 280/124.107, 124.149, 124.152; 403/109.1, 403/109.2, 109.3, 109.7, 109.8
See application file for complete search history.

(56) References Cited

U.S. PATENT DOCUMENTS

| 232,926 | A | 10/1880 | Berkholz |
| 456,827 | A | 7/1891 | Johnson |
| 980,508 | A | 1/1911 | Gardner |
| 1,993,260 | A | 3/1935 | Burns |
| 2,113,071 | A | 4/1938 | Allen |
| 2,366,461 | A | 1/1945 | Shoreys |
| 2,619,211 | A | 11/1952 | Belden |
| 2,738,210 | A | 3/1956 | Hjembo |
| 2,803,323 | A | 8/1957 | Newell |
| 2,875,876 | A | 3/1959 | Rudisch |
| 2,981,354 | A | 4/1961 | Ignatius et al. |
| 2,998,263 | A | 8/1961 | Muller et al. |

(Continued)

FOREIGN PATENT DOCUMENTS

DE    10002455 A1    7/2001

(Continued)

*Primary Examiner*—Faye M. Fleming
*Assistant Examiner*—Joseph Rocca
(74) *Attorney, Agent, or Firm*—Harness, Dickey & Pierce, P.L.C.

(57) ABSTRACT

A disconnectable link may include a first link member having a generally tubular portion, a first ball joint disposed on the first link member and adapted to engage a first suspension member; a second link member slidably receivable within the first link member; a second ball joint disposed on the second link member and adapted to engage a second suspension member; a lock shaft engaged with the second link member; and a lock element disposed within an aperture in the second link member. Movement of the lock shaft into a first position may cause the lock element to engage the first link member to prevent relative axial movement between the first and second link members, and movement of the lock shaft into a second position may cause the lock element to disengage the first link member to allow relative axial movement between the first and second link members.

20 Claims, 3 Drawing Sheets

U.S. PATENT DOCUMENTS

| | | | |
|---|---|---|---|
| 3,085,817 | A | 4/1963 | Krause et al. |
| 3,086,786 | A | 4/1963 | Tuczek |
| 3,180,469 | A | 4/1965 | Wiedmann et al. |
| 3,362,143 | A | 1/1968 | Gullickson |
| 3,643,642 | A | 2/1972 | Junes |
| 3,753,001 | A | 8/1973 | Hiroshima et al. |
| 3,820,812 | A | 6/1974 | Stubbs et al. |
| 4,128,259 | A | 12/1978 | Trent |
| 4,206,935 | A | 6/1980 | Sheppard et al. |
| 4,484,767 | A | 11/1984 | Klem |
| 4,597,480 | A | 7/1986 | Schwarz |
| 4,648,620 | A | 3/1987 | Nuss |
| 4,667,789 | A | 5/1987 | Cucchi et al. |
| 4,796,737 | A | 1/1989 | Tyler |
| 4,796,911 | A | 1/1989 | Kuroki et al. |
| 4,865,347 | A | 9/1989 | Fukushima et al. |
| 4,919,440 | A | 4/1990 | Tsukamoto |
| 4,919,441 | A | 4/1990 | Marier et al. |
| 4,919,444 | A | 4/1990 | Leiber et al. |
| 5,045,835 | A | 9/1991 | Masegi et al. |
| 5,092,625 | A | 3/1992 | Kawabata |
| 5,098,119 | A | 3/1992 | Williams et al. |
| 5,106,120 | A | 4/1992 | Di Maria |
| 5,186,486 | A * | 2/1993 | Hynds et al. .......... 280/124.107 |
| 5,186,586 | A | 2/1993 | Stephenson, Jr. |
| 5,189,615 | A | 2/1993 | Rubel et al. |
| 5,217,245 | A | 6/1993 | Guy |
| 5,251,926 | A | 10/1993 | Aulerich et al. |
| 5,324,056 | A | 6/1994 | Orton |
| 5,362,094 | A * | 11/1994 | Jensen ................. 280/124.107 |
| 5,527,061 | A | 6/1996 | Karl |
| 5,529,324 | A | 6/1996 | Krawczyk et al. |
| 5,580,079 | A | 12/1996 | Pradel et al. |
| 5,597,180 | A | 1/1997 | Ganzel |
| 5,597,258 | A | 1/1997 | Kincaid et al. |
| 5,601,165 | A | 2/1997 | Oppitz et al. |
| 5,700,027 | A | 12/1997 | Schiffler |
| 5,744,876 | A | 4/1998 | Fangio |
| 5,805,058 | A | 9/1998 | Saito et al. |
| 5,826,687 | A | 10/1998 | Bungeler et al. |
| 5,839,845 | A | 11/1998 | Kincaid et al. |
| 5,859,583 | A | 1/1999 | Mayumi et al. |
| 5,947,496 | A | 9/1999 | Kraft et al. |
| 5,954,353 | A | 9/1999 | Kincaid et al. |
| 5,987,366 | A | 11/1999 | Jun |
| 5,987,369 | A | 11/1999 | Kwak et al. |
| 5,995,891 | A | 11/1999 | Mayumi et al. |
| 6,007,079 | A | 12/1999 | Kincaid et al. |
| 6,007,080 | A | 12/1999 | Kincaid et al. |
| 6,019,383 | A | 2/2000 | Kociba et al. |
| 6,022,030 | A | 2/2000 | Fehring |
| 6,039,326 | A | 3/2000 | Agner |
| 6,076,840 | A | 6/2000 | Kincaid et al. |
| 6,149,166 | A | 11/2000 | Struss et al. |
| 6,254,114 | B1 | 7/2001 | Pulling et al. |
| 6,332,343 | B1 | 12/2001 | Koketsu et al. |
| 6,338,589 | B1 | 1/2002 | Kincaid et al. |
| 6,354,607 | B1 * | 3/2002 | Kawashima et al. ..... 280/5.511 |
| 6,361,033 | B1 | 3/2002 | Jones et al. |
| 6,425,585 | B1 | 7/2002 | Schuelke et al. |
| 6,428,019 | B1 | 8/2002 | Kincad et al. |
| 6,439,583 | B1 | 8/2002 | Markowetz |
| 6,481,732 | B1 | 11/2002 | Hawkins et al. |
| 6,498,403 | B1 | 12/2002 | Hagidaira et al. |
| 6,513,819 | B1 | 2/2003 | Oliver et al. |
| 6,517,094 | B1 | 2/2003 | Kincaid et al. |
| 6,530,586 | B2 | 3/2003 | Fader et al. |
| 6,533,490 | B2 | 3/2003 | Kincaid et al. |
| 6,550,788 | B2 | 4/2003 | Schmidt et al. |
| 6,551,006 | B2 | 4/2003 | Kincaid et al. |
| 6,552,444 | B1 | 4/2003 | Manning |
| 6,561,715 | B2 | 5/2003 | Wasylewski et al. |
| 6,604,270 | B2 | 8/2003 | Kincaid et al. |
| 6,637,757 | B2 | 10/2003 | Ignatius et al. |
| 6,651,991 | B2 | 11/2003 | Carlstedt et al. |
| 6,659,475 | B2 | 12/2003 | Clements et al. |
| 6,692,333 | B2 | 2/2004 | Kislevitz et al. |
| 6,695,521 | B2 | 2/2004 | Kincaid et al. |
| 6,805,361 | B2 | 10/2004 | Germano et al. |
| 6,811,166 | B2 | 11/2004 | Carlstedt et al. |
| 6,874,792 | B2 | 4/2005 | Vortmeyer et al. |
| 6,942,227 | B2 | 9/2005 | Heller et al. |
| 6,948,707 | B2 | 9/2005 | Gradu |
| 6,951,341 | B1 | 10/2005 | Beetz et al. |
| 6,958,030 | B2 | 10/2005 | DeGowske |
| 7,080,843 | B2 | 7/2006 | Heo |
| 7,100,926 | B2 | 9/2006 | Osterlanger et al. |
| 7,121,559 | B2 | 10/2006 | Ersoy et al. |
| 7,134,672 | B2 | 11/2006 | Beishline et al. |
| 7,150,458 | B2 | 12/2006 | Reichel et al. |
| 7,156,406 | B2 | 1/2007 | Kraus et al. |
| 7,204,494 | B2 | 4/2007 | Reichel et al. |
| 7,207,574 | B2 | 4/2007 | Gradu et al. |
| 7,226,056 | B2 | 6/2007 | Barron |
| 7,287,759 | B2 | 10/2007 | Uchiyama et al. |
| 7,290,772 | B2 | 11/2007 | Taneda et al. |
| 7,309,074 | B2 | 12/2007 | Taneda |
| 7,311,316 | B2 | 12/2007 | Yasui et al. |
| 7,322,580 | B2 | 1/2008 | Suzuki et al. |
| 7,344,142 | B2 | 3/2008 | Yasui |
| 7,390,002 | B2 | 6/2008 | Kasamatsu |
| 7,448,636 | B2 | 11/2008 | Johnson et al. |
| 2002/0125675 | A1 * | 9/2002 | Clements et al. ...... 280/124.152 |
| 2004/0217568 | A1 | 11/2004 | Gradu |
| 2005/0173226 | A1 | 8/2005 | Gold et al. |
| 2005/0206100 | A1 | 9/2005 | Ohta et al. |
| 2006/0049601 | A1 | 3/2006 | Matsumoto |
| 2006/0273539 | A1 | 12/2006 | Barth et al. |
| 2007/0018414 | A1 | 1/2007 | Yasui et al. |
| 2007/0108707 | A1 | 5/2007 | Kobayashi |
| 2009/0091093 | A1 | 4/2009 | Urababa et al. |

FOREIGN PATENT DOCUMENTS

| | | | |
|---|---|---|---|
| JP | 3227713 | A | 10/1991 |
| JP | 3227714 | A | 10/1991 |
| JP | 3231018 | A | 10/1991 |

* cited by examiner

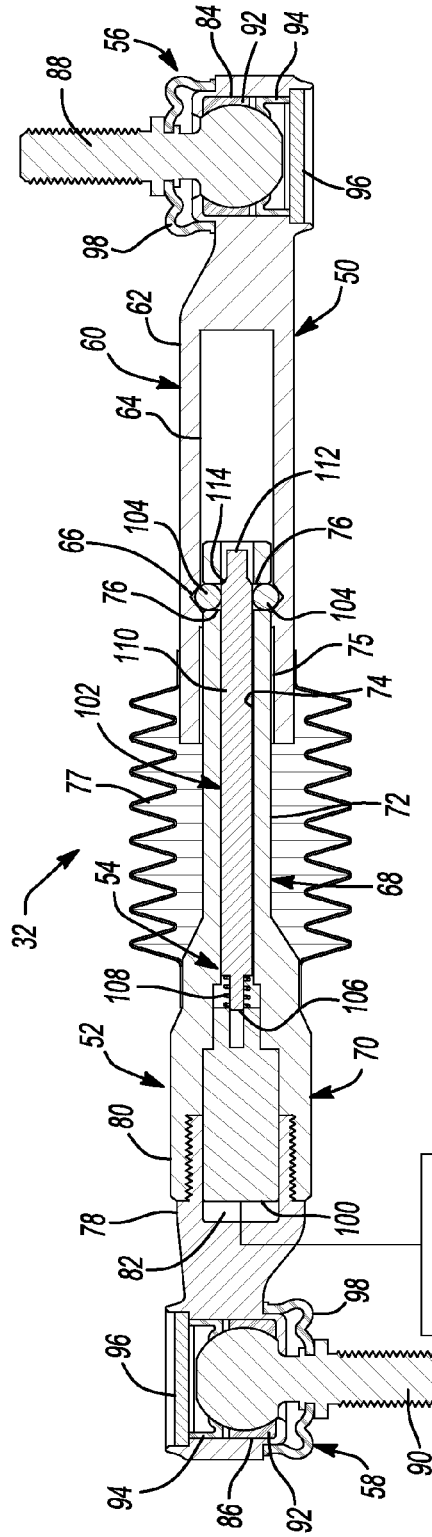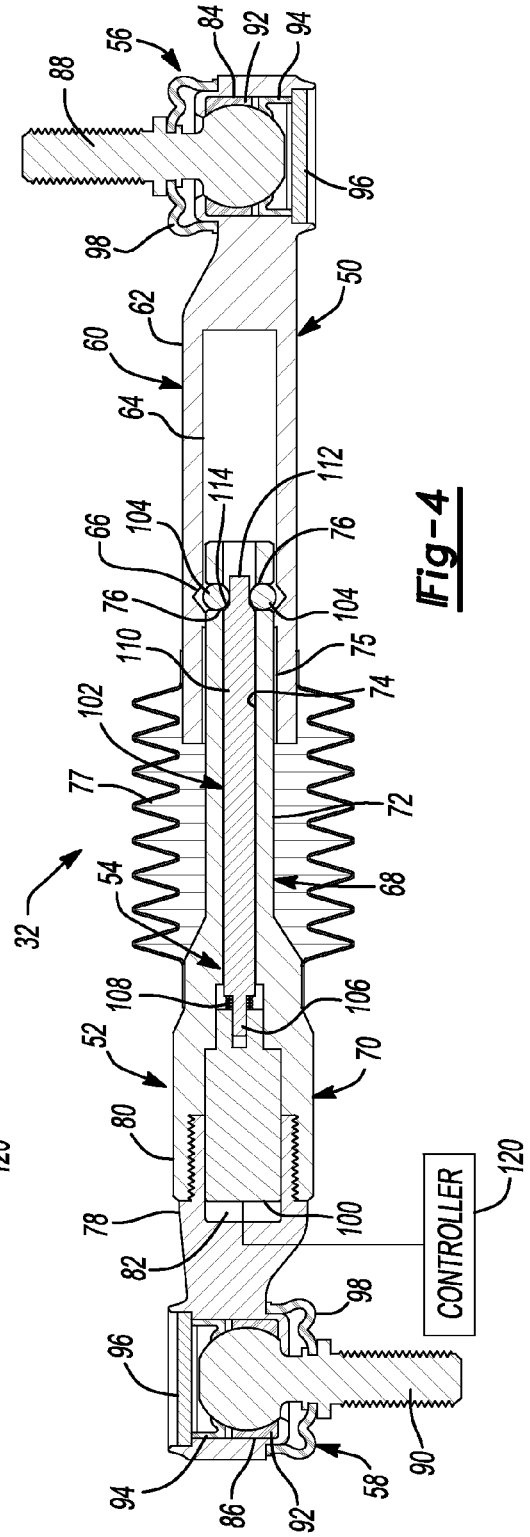

STABILIZER BAR WITH DISCONNECTABLE LINK

CROSS-REFERENCE TO RELATED APPLICATIONS

This application claims the benefit of U.S. Provisional Application No. 61/104,048 filed Oct. 9, 2009, the disclosure of which is hereby incorporated by reference as if fully set forth in detail herein.

FIELD

The present disclosure relates to a stabilizer bar and more particularly to a stabilizer bar with a disconnectable link.

BACKGROUND

This section provides background information related to the present disclosure which is not necessarily prior art.

When a vehicle travels around a corner or otherwise turns, centrifugal forces tend to cause the vehicle to roll, redistributing weight of the vehicle away from one or more of the vehicle's wheels. This weight redistribution may cause instability and may impede the ability of a driver to control the vehicle. To resist the vehicle's tendency to roll in response to centrifugal forces, vehicles typically include a stabilizer bar interconnecting two wheels of the vehicle.

While the stabilizer bar reduces roll, it also transmits shock from one wheel to another, causing the motion of one wheel to be copied to another wheel. If a vehicle so equipped was to strike a bump with one wheel, for example, the upward force (i.e., jounce) imparted to that wheel would be transmitted through the stabilizer bar to the opposite wheel, causing the opposite wheel to move in an upward direction. This "crosstalk" between the vehicle wheels is undesirable, as it adversely affects vehicle ride.

Torsional stiffness of stabilizer bars may inhibit free and independent travel of the vehicle wheels relative to each other. The weight of a wheel and its mounting structure is typically insufficient to cause the stabilizer bar to rotate. This condition may hinder the vehicle's ability to effectively navigate uneven terrain. For example, it is possible for one of the vehicle wheels to remain in an elevated position over a dip in the terrain due to the torsional resistance of the stabilizer bar, thereby preventing all of the vehicle's wheels or tires from adequately gripping the terrain.

The teachings of the present disclosure provide a relatively cost-effective and less complex means for disconnecting one or more of the vehicle's wheels from an anti-roll system. Further, integrating such means into the vehicle may be less burdensome on vehicle packaging constraints than previously known anti-roll systems that are disconnectable at a point on the stabilizer bar.

SUMMARY

This section provides a general summary of the disclosure, and is not a comprehensive disclosure of its full scope or all of its features.

In one form, the present disclosure provides a stabilizer bar having a disconnectable link including a first link member having a generally tubular portion, a first ball joint disposed on the first link member and adapted to engage a first suspension member; a second link member slidably receivable within the first link member; a second ball joint disposed on the second link member and adapted to engage a second suspension member; a lock shaft engaged with the second link member and selectively movable between a first position and second position; and a lock element disposed within an aperture in the second link member. Movement of the lock shaft into the first position may cause the lock element to engage the first link member to prevent relative axial movement between the first and second link members, and movement of the lock shaft into the second position may cause the lock element to disengage the first link member to allow relative axial movement between the first and second link members.

In another form, the present disclosure provides a disconnectable link which may include a first link member including a first coupling engaging a suspension member; a second link member having a second coupling engaging a second suspension member, the second link member coaxially engaging the first link member; a lock shaft slidably engaged with the second link member; a lock element movably disposed in a radially disposed aperture in the second link member; and an actuator selectively moving the lock shaft between first and second positions relative to the second link member. The lock element may engage a detent in the first link member when the lock shaft is in the first position to prevent relative axial movement between the first and second link members, and the lock element disengages the detent when the lock shaft is in the second position to allow relative axial movement between the first and second link members.

In another form, the present disclosure provides an anti-roll system for a vehicle including a stabilizer bar having a disconnectable link. The disconnectable link may include a first link member having a first ball joint and a first tubular portion having at least one radially disposed detent; a second link member having a second ball joint, a cavity and a second tubular portion slidably engaging the first tubular portion; a lock shaft having a body portion, a tip portion and an inclined portion connection the body portion and the tip portion, the body portion having a first diameter and the tip portion having a second diameter, the lock shaft being disposed within the second tubular portion; a motor having a plunger engaging the lock shaft, the motor selectively causing axial movement of the lock shaft relative to the second link member; and a plurality of lock elements movably engaging a plurality of radially disposed apertures in the second link member, each of the plurality of lock elements selectively engaging the at least one radially disposed detent in the first link member. Energizing the motor may move the lock shaft into a first position such that the tip portion is radially aligned with the plurality of lock elements, allowing the lock elements to disengage the at least one radially disposed detent, thereby allowing relative axial movement between the first and second link members. De-energizing the motor may allow a spring member to force the lock shaft into a second position such that the body portion is radially aligned with the plurality of lock elements, forcing the lock elements to engage the at least one radially disposed detent, thereby preventing relative axial movement between the first and second link member. One of the first and second ball joints may be engaged with the stabilizer bar and another of the first and second ball joints may be engaged with a control arm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a cross-sectional view of the disconnectable link in an engaged position according to the principles of the present disclosure; and FIG. 4 is a cross-sectional view of the disconnectable link in a disengaged position according to the principles of the present disclosure.

Corresponding reference numerals indicate corresponding parts throughout the several views of the drawings.

DETAILED DESCRIPTION

Figure 1:
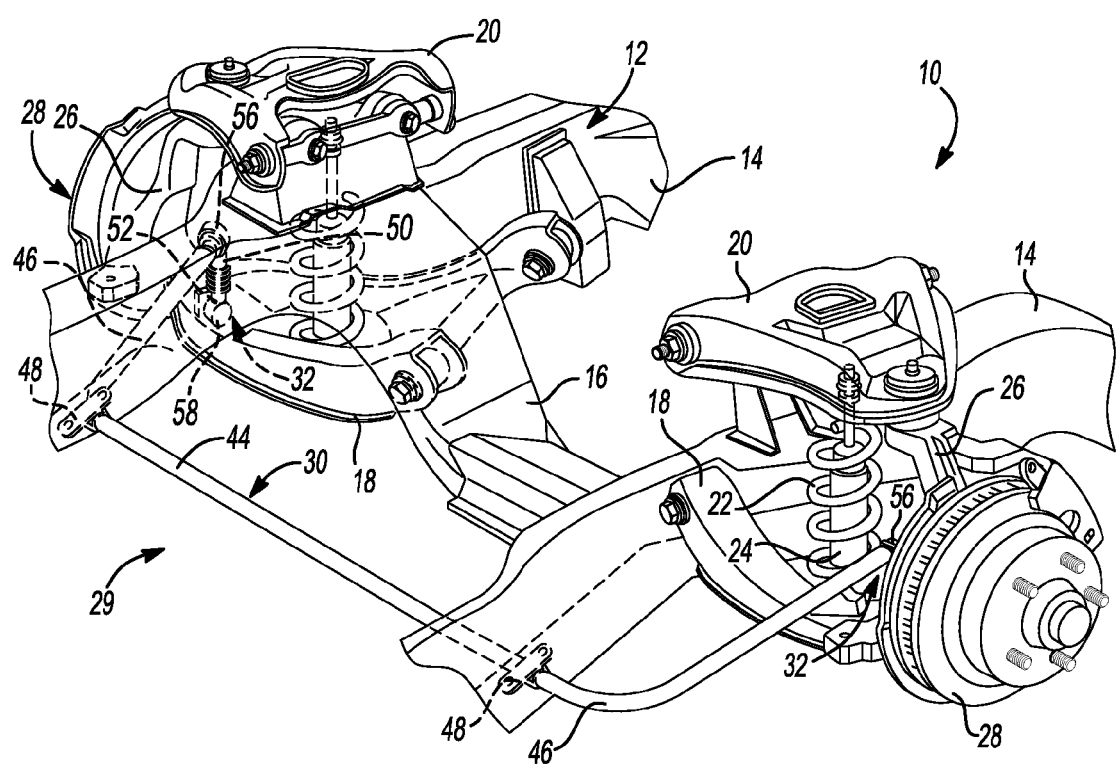
FIG. 1 is a perspective view of a front wheel suspension of a vehicle including a stabilizer bar having a disconnectable link according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1 of the drawings, an exemplary independent front wheel suspension, generally indicated by reference numeral 10, of the type having suspension components at each wheel, which are suspended from a vehicle frame 12. Reference will be made to the vehicle frame in the present disclosure, yet those skilled in the art will recognize that many current vehicles do not have a frame as such, but instead have regions of the body, which act as an integrated frame structure. With this in mind, the frame 12 is shown to partially include a pair of longitudinal side rails 14 and a crossbeam 16.

At each wheel, the suspension 10 includes a lower control arm 18 and an upper control arm 20 which are both pivotally attached to the frame 12. A strut assembly having a helical coil spring 22 and a strut damper 24 is retained between an intermediate portion of the lower control arm 18 and the frame 12 to support the weight of the vehicle body and any loads which are transmitted through the lower control arm 18. The upper control arm 20 is connected to the lower control arm 18 by a steering knuckle 26. A hub and rotor assembly 28 is rotatably attached to a spindle portion (not shown) of the steering knuckle 26 such that a wheel and tire (also not shown) may be mounted thereon. The suspension system 10 further includes an anti-roll system 29 that can include a stabilizer bar assembly 30 and a pair of disconnectable end links 32 which connect the ends of the stabilizer bar assembly 30 to the lower control arms 18. The stabilizer bar assembly 30 is shown to be generally U-shaped having a central segment 44, which extends laterally across the vehicle, and arm segments 46, that extend longitudinally along the vehicle from the distal ends of the central segment 44. The central segment 44 may be rotatably attached to the frame rails 14 by mounting brackets 48. The opposite end of each arm segment 46 may be connected to a corresponding one of the lower control arms 18 by one of the disconnectable links 32. Although the anti-roll system 29 is described above as having a pair of disconnectable end links 32, one of ordinary skill in the art will appreciate that the anti-roll system 29 could include only one disconnectable link 32.

Figure 2:
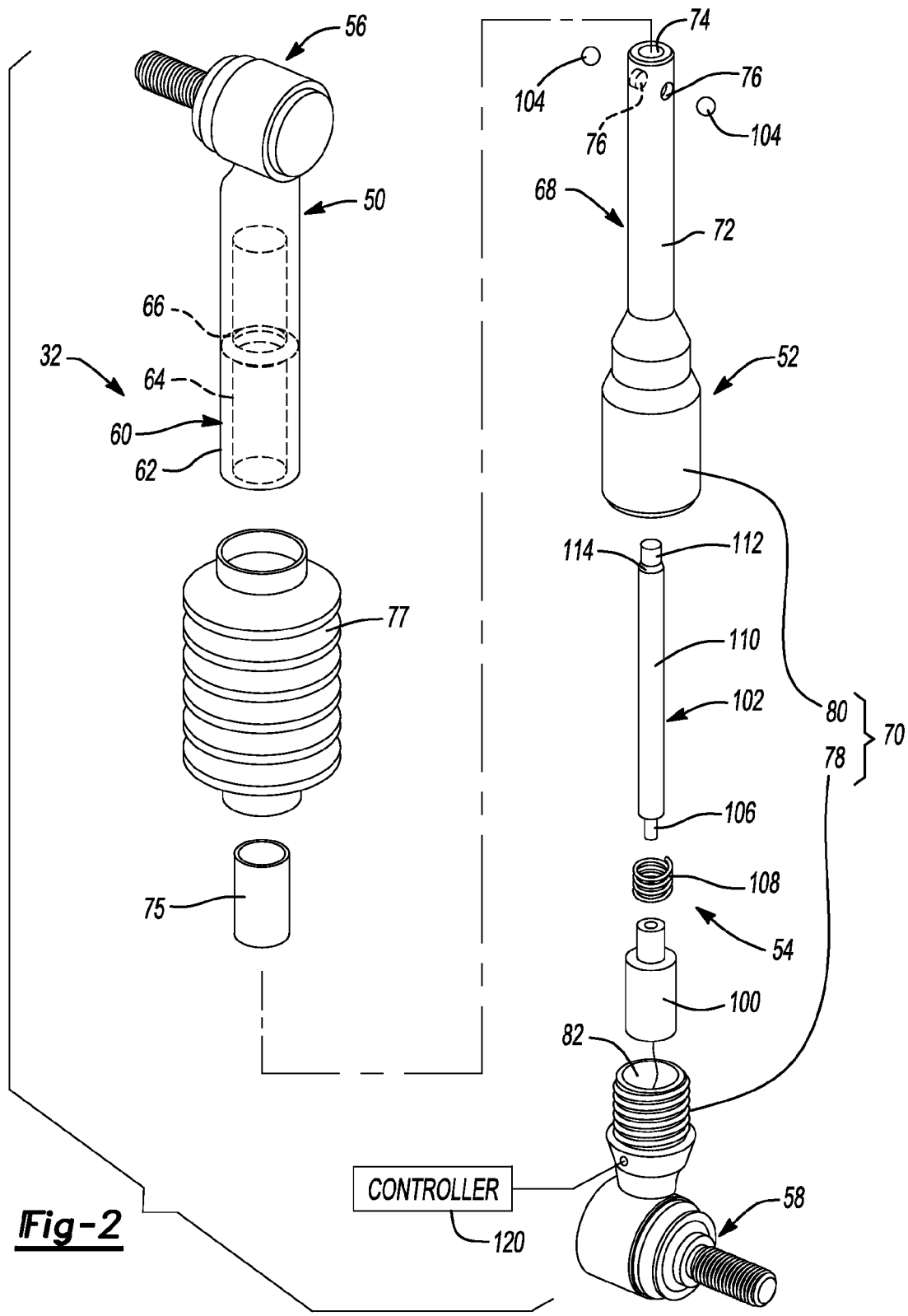
FIG. 2 is an exploded perspective view of the disconnectable link of FIG. 1.

Referring now to FIGS. 2-4, each of the disconnectable links 32 may include a first link member 50, a second link member 52 and a locking mechanism 54. When the locking mechanism 54 is in an engaged position (FIG. 3), the first and second link members 50, 52 are axially fixed relative to each other, as will be subsequently described. When the locking mechanism 54 is in a disengaged position (FIG. 4), the first and second link members 50, 52 are axially movable relative to each other, as will be subsequently described.

The first and second link members 50, 52 may include first and second ball joints 56, 58, respectively. The first link member 50 may engage one of the arm segments 46 via the first ball joint 56 (FIG. 1). The second link member 52 may engage one of the lower control arms 18 (FIG. 1) via the second ball joint 58. Alternatively, the disconnectable link 32 could be configured relative to the suspension 10 (FIG. 1) such that the first link member 50 may be engaged with the lower control arm 18 (FIG. 1) via the first ball joint 56, and the second link member 52 may be engaged with the arm segment 46 (FIG. 1) via the second ball joint 58.

The first link member 50 may be an elongated member including a generally tubular portion 60 having an outer surface 62 and an inner surface 64. The inner surface 64 may include a detent 66, which may be an annular groove having a generally V-shaped cross-section and extending around at least a portion of the diameter of the inner surface 64. It will be appreciated that in the alternative, the inner surface 64 could have a plurality of discrete detents 66.

The second link member 52 may be coaxially aligned with the first link member 50 and may be an elongated member that can include a tubular portion 68 and a body portion 70. The tubular portion 68 may be defined by an outer surface 72 and an inner surface 74. A plurality of generally cylindrical apertures 76 may be disposed in the tubular portion 68 and may extend through the outer surface 72 and the inner surface 74. The tubular portion 68 of the second link member 52 may slidably engage the tubular portion 60 of the first link member 50. The inner surface 64 of the first link member 50 may include a bearing 75 fixed to the inner surface 64 of the first link member 50 to facilitate the axially slidable relationship between the first and second link members 50, 52. An expandable boot or bellows 77 may be fixed at one end to the first link member 50 and fixed at the other end to the second link member 52. The expandable bellows 77 provides protection from dirt, water and/or other contaminants and can expand and contract in synchronization with relative axial movement between the first and second link members 50, 52.

The body portion 70 of the second link member 52 may include first and second halves 78, 80, each having concave ends. The first and second halves 78, 80 may be threadably engaged, welded, bolted or otherwise suitably fastened to each other such that the concave ends cooperate to form a cavity 82. The cavity 82 may be in communication with the tubular portion 68. The first half 78 may be integrally formed with a portion of the second ball joint 58. The second half 80 may be integrally formed with the tubular portion 68.

The first and second ball joints 56, 58 may include first and second sockets 84, 86, respectively, and first and second ball studs 88, 90, respectively. The first and second sockets 84, 86 may be integrally formed with the first and second link members 50, 52, respectively. A ball seat 92 and a spring seat 94 may be disposed within each of the first and second sockets 84, 86 and may cooperate to form a spherical surface therein to engage the spherical portions of the first and second ball studs 88, 90, respectively. Socket plugs 96 may be pressed, welded, crimped or otherwise fixed into an opening of each of the first and second sockets 84, 86, respectively, to retain the first and second ball studs 88, 90, respectively, ball seats 92 and spring seats 94 therein. A flexible link seal 98 may be disposed over the other opening of each of the first and second sockets 84, 86, respectively, to prevent contaminants from entering the first and second sockets 84, 86. The first and second ball joints 56, 58 facilitate relative angular movement between the stabilizer bar assembly 30 and the lower control arm 18. One of ordinary skill in the art will appreciate that the ball joints 56, 58 could be otherwise configured.

The locking mechanism 54 may include a motor 100, a lock shaft 102 and a plurality of lock elements 104. The motor 100 can be a linear motor, such as a solenoid, and may be housed within the cavity 82 in the second link member 52. The motor 100 may include an output shaft (or plunger) 106 that is linearly movable in response to a control signal being received by the motor 100. The output shaft 106 may be integrally formed or engaged with the lock shaft 102 to transmit linear motion thereto. A spring member 108 may be disposed around the output shaft 106, between opposing axially disposed surfaces of the lock shaft 102 and motor 100, respectively, to bias the lock shaft 102 away from the motor 100. It should be appreciated that the locking mechanism 54 could include any suitable motor and that such motor could be electrically, hydraulically and/or pneumatically operated.

A controller 120 can be provided to control operation of the motor 100. For example, the controller 120 can direct electric power to the motor 100. One or more sensors, of any appropriate type, may be in communication with the controller 120 and may be configured to determine whether the disconnectable link 32 is in the engaged position (FIG. 3) or the disengaged position (FIG. 4). For example, the sensors may be could be configured to sense a position of the lock elements 104 and/or the detent 66 and generate a sensor signal in response thereto. Additionally or alternatively, the sensors could be configured to sense a position of one of the first and second link members 50, 52 relative to a position of the other one of the first and second link members 50, 52.

The lock shaft 102 may be an elongated, generally cylindrical member including a body portion 110 having a first diameter, a tip portion 112 having a second diameter, and an inclined surface 114 disposed between the body portion 110 and the tip portion 112. The body portion 110 may be coaxially aligned with the second link member 52 and may be slidably engaged with the tubular portion 68 of the second link member 52.

The lock elements 104 may be movably disposed within the apertures 76 in the second link member 52. In the particular example provided, the lock elements comprise a pair of bearing balls. When the disconnectable link 32 is in the engaged position (FIG. 3), the lock shaft 102 forces the lock elements 104 outward into the detent 66 such that the lock elements 104 are in engagement with the first and second link members 50, 52, thereby preventing relative axial movement therebetween. When the disconnectable link 32 is in the disengaged position (FIG. 4), the lock elements 104 are allowed to retract inward and disengage the detent 66, thereby allowing relative axial movement between the first and second link members 50, 52.

With reference to FIGS. 3 and 4, operation of the disconnectable link 32 will be described in detail. The lock shaft 102 is selectively movable via the motor 100 between the engaged position (FIG. 3) and the disengaged position (FIG. 4) to prevent and allow, respectively, relative axial movement between the first and second link members 50, 52. When the first and second link members 50, 52 are allowed to move relative to each other, the front wheels of the vehicle are allowed to move upward and downward independently of each other without transmitting that motion to each other through the stabilizer bar 30 (FIG. 1). In this manner, when one of the wheels rolls over a bump, the resultant shock to the wheel will not be transmitted to the other wheel via the stabilizer bar 30 (FIG. 1), as the disconnectable link 32 (connected to the stabilizer bar 30 at one of the ball joints 56, 58 and connected to the lower control arm 18 (FIG. 1) at the other of the ball joints 56, 58) allows the lower control arm 18 (FIG. 1) (and hence the wheel) to move relative to the stabilizer bar 30 (FIG. 1).

The disconnectable link 32 may include a control system adapted to control the locking mechanism 54. The control system may include a controller 120 in communication with the motor 100 and may selectively generate the control signal to cause the motor 100 to move the lock shaft 102 between the disengaged position (FIG. 4) and the engaged position (FIG. 3), respectively. A switch or other control interface (not shown) may be in communication with the controller 120 and may be disposed in the cab of the vehicle to allow a driver to manually energize and/or de-energize the motor 100. Additionally or alternatively, the controller 120 may cause the locking mechanism 54 to selectively prohibit and allow relative movement between the first and second link members 50, 52 in response to the vehicle attaining a predetermined speed or other driving conditions. It should be appreciated that various control methodologies could be employed to control the operation of the disconnectable link 32. For example, the control system and the methodology employed by the controller 120 could be of the type disclosed in U.S. Pat. No. 6,637,757, the disclosure of which is hereby incorporated by reference as if fully set forth herein in its entirety.

Upon receipt of the control signal, the motor 100 can move the output shaft 106 against the bias of the spring 108 (to the left relative to the view shown in FIG. 3), to cause the lock shaft 102 to simultaneously translate relative to the tubular portion 68 of the second link member 52 and compress the spring member 108 against the motor 100. In this position (FIG. 4), the tip portion 112 of the lock shaft 102 is aligned with the apertures 76 in the second link member 52. The relatively smaller diameter of the tip portion 112 provides clearance for the lock elements 104 to retract inward and out of engagement with the detent 66, thereby allowing relative axial movement between the first and second link members 50, 52. Moreover, the tapered walls of the detent 66 can urge the lock elements 104 into the apertures 76 while an axially directed force acts on the first link member 50 and/or the second link member 52 to initiate relative axial movement between the first and second link members 50, 52.

Upon removal of the control signal, the spring member 108 can bias the lock shaft 102 back toward the engaged position (FIG. 3), whereby the increasing diameter of the inclined surface 114 can force the lock elements 104 radially outward into engagement with the detent 66 to prevent relative movement between the first and second link members 50, 52.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A disconnectable link comprising:
a first link member having a generally tubular portion,
a first ball joint disposed on said first link member and adapted to engage a first suspension member;
a second link member slidably receivable within said first link member;
a second ball joint disposed on said second link member and adapted to engage a second suspension member;
a lock shaft engaged with said second link member and selectively movable between a first position and second position; and
a lock element disposed within an aperture in said second link member,
wherein movement of said lock shaft into said first position causes said lock element to engage said first link member to prevent relative axial movement between said first and second link members, and movement of said lock shaft into said second position causes said lock element to disengage said first link member to allow relative axial movement between said first and second link members.

2. The disconnectable link of claim 1, wherein said lock element is adapted to engage a detent disposed in said first link member.

3. The disconnectable link of claim 1, wherein said lock shaft is coaxially disposed within said second link member.

4. The disconnectable link of claim 1, wherein said lock shaft includes a body portion having a first width and a tip portion having a second width.

5. The disconnectable link of claim 4, wherein aligning said lock element and said tip portion allows said lock element to disengage said first link member.

6. The disconnectable link of claim 4, wherein said lock shaft includes an inclined surface connecting said body portion and said tip portion, and said inclined surface is adapted to force said lock element radially outward in response to movement of said lock shaft from said second position to said first position.

7. The disconnectable link of claim 1, further comprising a plurality of lock elements disposed in a plurality of apertures in said second link member, each of said plurality of lock elements selectively engage at least one detent disposed in said first link member.

8. The disconnectable link of claim 1, wherein one of said first and second link members is coupled to a stabilizer bar.

9. The disconnectable link of claim 1, wherein one of said first and second link members is coupled to a control arm.

10. The disconnectable link of claim 1, wherein a motor selectively causes movement of said lock shaft.

11. A disconnectable link comprising:
a first link member including a first coupling engaging a suspension member;
a second link member having a second coupling engaging a second suspension member, said second link member coaxially engaging said first link member;
a lock shaft slidably engaged with said second link member;
a lock element movably disposed in a radially disposed aperture in said second link member; and
an actuator selectively moving said lock shaft between first and second positions relative to said second link member,
wherein said lock element engages a detent in said first link member when said lock shaft is in said first position to prevent relative axial movement between said first and second link members, and said lock element disengages said detent when said lock shaft is in said second position to allow relative axial movement between said first and second link members.

12. The disconnectable link of claim 11, wherein each of said first and second couplings are ball joints.

13. The disconnectable link of claim 11, wherein one of said first and second links is coupled to a stabilizer bar.

14. The disconnectable link of claim 11, wherein one of said first and second links is coupled to a control arm.

15. The disconnectable link of claim 11, wherein said lock shaft includes a body portion having a first width and a tip portion having a second width.

16. The disconnectable link of claim 15, wherein aligning said bearing with said tip portion of provides clearance for said lock element to disengage said detent.

17. The disconnectable link of claim 15, wherein said lock shaft includes an inclined surface connecting said body portion and said tip portion, and said inclined surface is adapted to force said lock element radially outward in response to movement of said lock shaft from said second position to said first position.

18. The disconnectable link of claim 11, wherein said actuator is a solenoid.

19. The disconnectable link of claim 11, further comprising a plurality of lock elements disposed in a plurality of apertures in said second link member, each of said plurality of lock elements selectively engage at least one detent disposed in said first link member.

20. An anti-roll system for a vehicle including a stabilizer bar having a disconnectable link, the disconnectable link comprising:

a first link member having a first ball joint and a first tubular portion having at least one radially disposed detent;

a second link member having a second ball joint, a cavity and a second tubular portion slidably engaging said first tubular portion;

a lock shaft having a body portion, a tip portion and an inclined portion connection said body portion and said tip portion, said body portion having a first diameter and said tip portion having a second diameter, said lock shaft being disposed within said second tubular portion;

a motor having a plunger engaging said lock shaft, said motor selectively causing axial movement of said lock shaft relative to said second link member; and a plurality of lock elements movably engaging a plurality of radially disposed apertures in said second link member, each of said plurality of lock elements selectively engaging said at least one radially disposed detent in said first link member, wherein energizing said motor moves said lock shaft into a first position such that said tip portion is radially aligned with said plurality of lock elements, allowing said lock elements to disengage said at least one radially disposed detent, thereby allowing relative axial movement between said first and second link members, wherein de-energizing said motor allows a spring member to force said lock shaft into a second position such that said body portion is radially aligned with said plurality of lock elements, forcing said lock elements to engage said at least one radially disposed detent, thereby preventing relative axial movement between said first and second link member, wherein one of said first and second ball joints is engaged with said stabilizer bar and another of said first and second ball joints is engaged with a control arm.

* * * * *